United States Patent [19]  
Hughes

[11] Patent Number: 5,142,943  
[45] Date of Patent: Sep. 1, 1992

[54] CLUTCH DRIVE DIFFERENTIAL SYSTEM

[76] Inventor: Leon D. Hughes, 4709 N. Lamesa Rd., Midland, Tex. 79765

[21] Appl. No.: 768,388

[22] Filed: Sep. 30, 1991

[51] Int. Cl.⁵ .................. F16H 35/04; F16H 35/00; F16D 21/00; F16D 19/00
[52] U.S. Cl. .................................... 74/650; 74/390; 192/49; 192/93 A
[58] Field of Search ............... 74/650, 390; 192/49, 192/93 A, 54

[56] References Cited

U.S. PATENT DOCUMENTS

| | | | |
|---|---|---|---|
| 1,274,090 | 7/1918 | Settergren | 74/650 X |
| 1,965,673 | 7/1934 | Sipprell et al. | 192/43 |
| 2,179,923 | 11/1939 | De Lavaud | 74/650 |
| 2,385,864 | 10/1945 | Knoblock | 74/650 |
| 2,490,172 | 12/1949 | Swahnberg | 192/45 |
| 2,638,794 | 5/1953 | Knoblock | 74/650 |
| 2,915,156 | 12/1959 | Horn | 192/41 R |
| 3,563,352 | 2/1969 | Stibbe | 192/3.54 |
| 3,762,519 | 10/1973 | Bentley | 192/105 BB |
| 4,400,996 | 8/1983 | Schou | 74/650 |
| 4,454,937 | 6/1984 | Yang | 192/43 X |
| 4,745,818 | 5/1988 | Edwards et al. | 74/650 |
| 4,782,720 | 11/1988 | Teraoka et al. | 192/93 A X |

Primary Examiner—Leslie A. Braun  
Assistant Examiner—David E. Henn  
Attorney, Agent, or Firm—Leon D. Hughes

[57] ABSTRACT

A vehicle has a motor with a shaft extending from each end to drive a pair of opposed wheel axles connected to a pair of wheels. Each wheel axle extends into an axle housing. There is a control cylinder in each housing connected to rotate the wheel axle. The control cylinder acts as a driven clutch and is engaged by a pressure plate. A ring gear in each housing is journaled to the wheel axle. The ring gear has a cam face that engages a cam face located on the pressure plate which has a clutch face and a cam face. The pressure plate is journaled to the wheel shaft. A cam on the face of the ring gear and the clutch plate moves the ring gear and the clutch plate axially apart and this action forces the faces of the pressure plate and the driven clutch together.

20 Claims, 7 Drawing Sheets

CLUTCH DRIVE DIFFERENTIAL SYSTEM

BACKGROUND OF THE INVENTION

Transmission apparatus by which power is transmitted between the rotating shaft of a prime mover and another shaft is well known to those skilled in the art, and there are many patents and other references available for many different transmission apparatus.

It is known to connect opposed shafts by a friction clutch as shown by U.S. Pat. No. 2,385,864 to Knoblock. Also, over-running clutches are known as shown in Stibbe, U.S. Pat. No. 3,563,352 and Bentley U.S. Pat. No. 3,762,519.

Sipprell, U.S. Pat. No. 1,965,673 discusses automatic clutch devices for transmitting power and discloses disks having cam faces thereon for axially moving the disk. Horn, U.S. Pat. No. 2,915,156, and Swahnberg, U.S. Pat. No. 2,490,172, disclose a friction clutch having balls received within grooves that are arranged to provide an over-running clutch. Moreover, many differential mechanisms are old in the art as shown by the above patent to Knoblock and Stibbe.

None of the prior art known to Applicant, however, provides a practical and inexpensive drive system wherein a power source has opposed shaft ends, each connected to turn an axle of a pair of axles and thereby transmit power with a force that is proportional to the torque delivered to the driven member, and to provide a differential action having positive traction mode and a free wheeling mode in the manner set forth herein. Hence, there is no transmission to be found in the prior art that is similar in operation and structure to the transmission set forth herein.

SUMMARY OF THE INVENTION

The present invention comprehends an automatic transmission for connecting a prime mover to a drive axle. The apparatus, according to the invention, provides a clutch drive for propelling a vehicle, and especially a vehicle of the type having a chassis supported from a drive wheel.

One preferred embodiment is a differential system for propelling a vehicle of the type having a chassis supported from a pair of drive wheels. The differential system provides an automatic transmission that connects a prime mover to a drive axle for the drive wheels.

More specifically the invention broadly includes a rotatable driven member for rotating the axle of each of a pair of wheels. Next to the rotatable driven member and mounted on the axle of each wheel is a free floating pressure plate arranged to be moved axially in proportion to relative rotational movement between the driven member and the pressure plate. The driven member and the adjacent pressure plate are journaled to freely rotate on the axle. A driven control cylinder is affixed to and turns the axle when engaged with the rotatable driven member. Axial movement of the pressure plate into engagement with the driven clutch or control cylinder transmits power with a force that is proportional to the torque delivered to the driven member. Biasing means urge the control cylinder and pressure plate apart while power input thereinto urges the control cylinder and pressure plate together.

In a specific embodiment, the invention comprises a pair of wheel axles for driving a pair of wheels, there being a right axle housing and a left axle housing with one of the wheel axles being journaled within one of the housings. A control cylinder driven clutch in each said housing is attached to rotate the wheel axle. A ring gear in each housing is journaled to the wheel axle. The ring gear has a cam face thereon that engages a coacting cam face located on an adjacent pressure plate which has opposed faces, one of which is a clutch face and the other cam face. A motor driven shaft extends in opposed directions into driving engagement with the ring gear associated with each housing. A pressure plate journaled to the wheel shaft has a clutch face formed thereon that is brought to bear against the pressure plate located on the side adjacent the ring gear and thereby provide a clutching action therebetween. Hence, the cam means on the confronting faces of the ring gear and the clutch plate move the ring gear and the clutch plate axially apart and thereby force the confronting faces of the pressure plate and ring gear clutch face together in proportion to the power input thereto. The control cylinder and pressure plate are biased apart by a spring means at low power input while the clutch faces are forced together by the cam means at high power input.

A primary object of the present invention is the provision of a clutch drive differential system for propelling a vehicle of the type having a pair of drive wheels that supports the vehicle.

Another object of the invention is to provide a motor driven shaft that extends in opposed directions into driving engagement with a gear box having clutch faces that are biased apart by a spring means at low power input while the clutch faces are forced together by a cam means at high power input.

Another and still further object of this invention is the provision of a transmission having a pressure plate and a ring gear journaled to a wheel shaft, a clutch face on the pressure plate on the side adjacent the ring gear; cam means on the confronting faces of said ring gear and the clutch plate for moving the ring gear and the clutch plate axially apart and thereby force the confronting clutch faces together to thereby deliver power in proportion to the power input.

An additional object of the present invention is the provision of a transmission in combination with a prime mover and a pair of wheel axles, that includes oposed gear boxes each having a pressure plate therein that is journaled to the wheel axle, and a clutch face on the pressure plate on the side adjacent the ring gear; means on the confronting faces of the ring gear and the clutch plate for moving the ring gear and the clutch plate axially apart in response to the magnitude of power input to thereby force the confronting faces thereof together with a clutch action. An Eddy current clutch coil is connected to augment the action of the free floating clutch in both the accelerating and breaking mode.

These and various other objects and advantages of the invention will become readily apparent to those skilled in the art upon reading the following detailed description and claims and by referring to the accompanying drawings.

The above objects are attained in accordance with the present invention by the provision of a combination of elements which includes a motor driven shaft for driving a ring gear that is journaled to freely rotate on a wheel axle. The ring gear has a face thereon that engages the face of an adjacent pressure plate which also is journaled to freely rotate on the wheel axle. The engaged faces of the ring gear and pressure plate have means thereon for changing relative rotational movement therebetween into axial movement of the pressure plate. This moves the pressure plate axially into engagement with a control cylinder, and a spring biasing means returns the pressure plate and control cylinder to a neutral position of operation. The control cylinder is affixed to the wheel axle and turns the wheel axle with a force that is proportional to the torque delivered by the co-acting clutch faces located on the confronting faces of the pressure plate and adjacent control cylinder.

DETAILED DESCRIPTION OF THE PREFERRED EMBODIMENT

Figure 1:
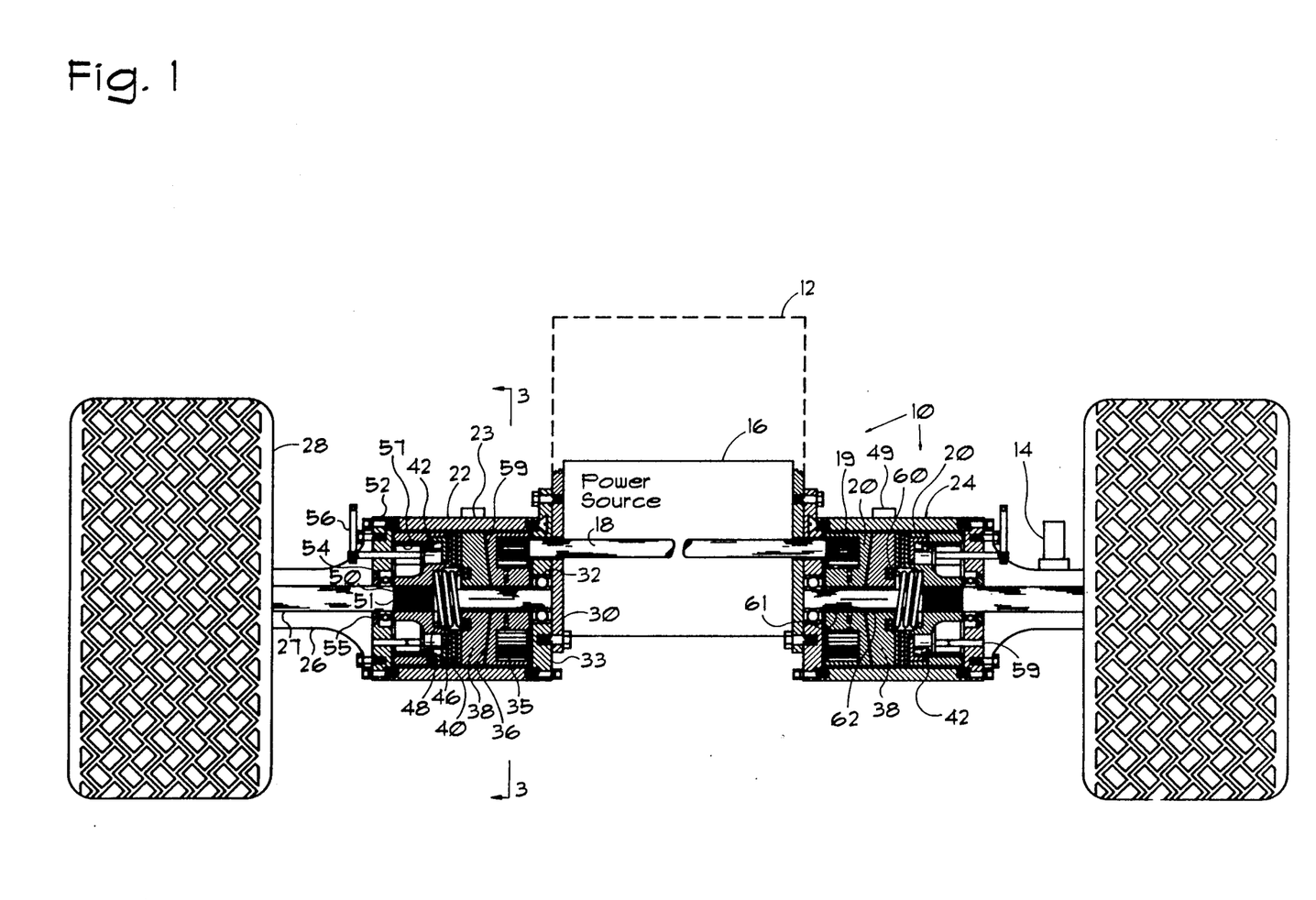
FIG. 1 is a part diagrammatical, part cross-sectional end view of a clutch drive differential system made in accordance with this invention, with some parts thereof being broken away therefrom.

FIG. 1, together with other figures of the drawings, discloses a vehicle 10 having a cab 12 supported from a frame 14. An electric motor 16 has a shaft 18 extending in opposed directions and terminating at drive gear 19. A ring gear 20 is rotatably housed within gear box 22 that forms gear housing 23; there being a right hand housing 24 and a left hand housing 22. An axle housing 26 extends from the gear box and rotatably encloses axle 27 therewithin. The axle is connected to rotate wheels 28.

The gear boxes are each attached to a mounting plate 30. A pilot bearing 32 rotatably mounts the end of shaft 27 to end plate 33 which forms a support and closure member for the housing 23.

Figure 2:
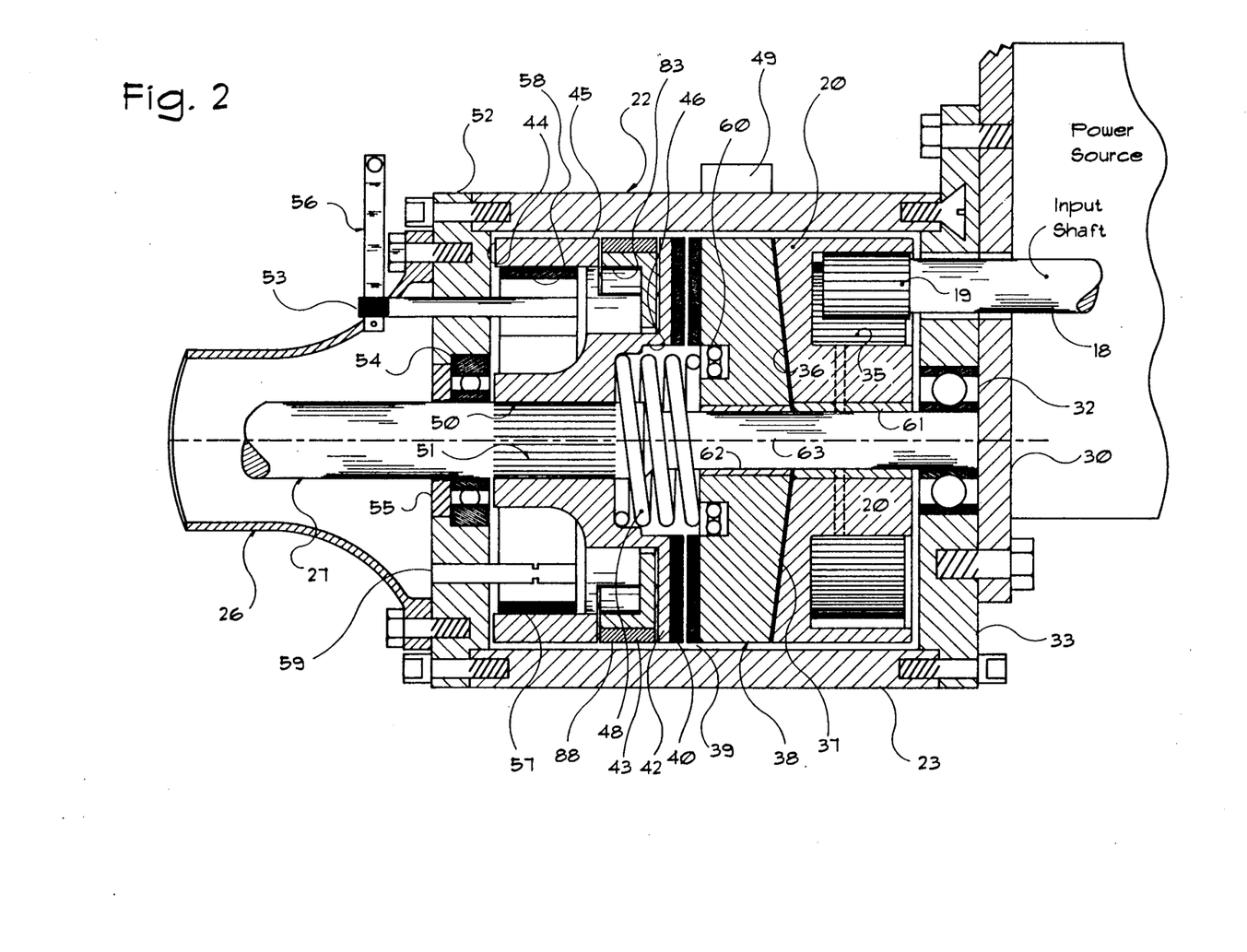
FIG. 2 is an enlarged, fragmentary, part longitudinal cross-sectional view of part of the apparatus disclosed in FIG. 1.
Figure 3:
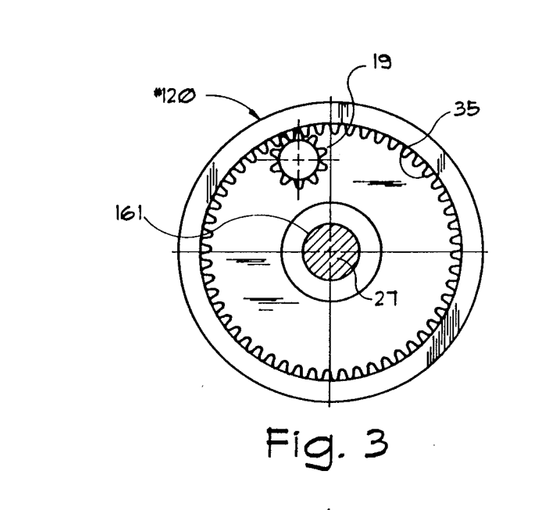
FIG. 3 is a cross-sectional view taken along line 3—3 of FIG. 1.
Figure 4:
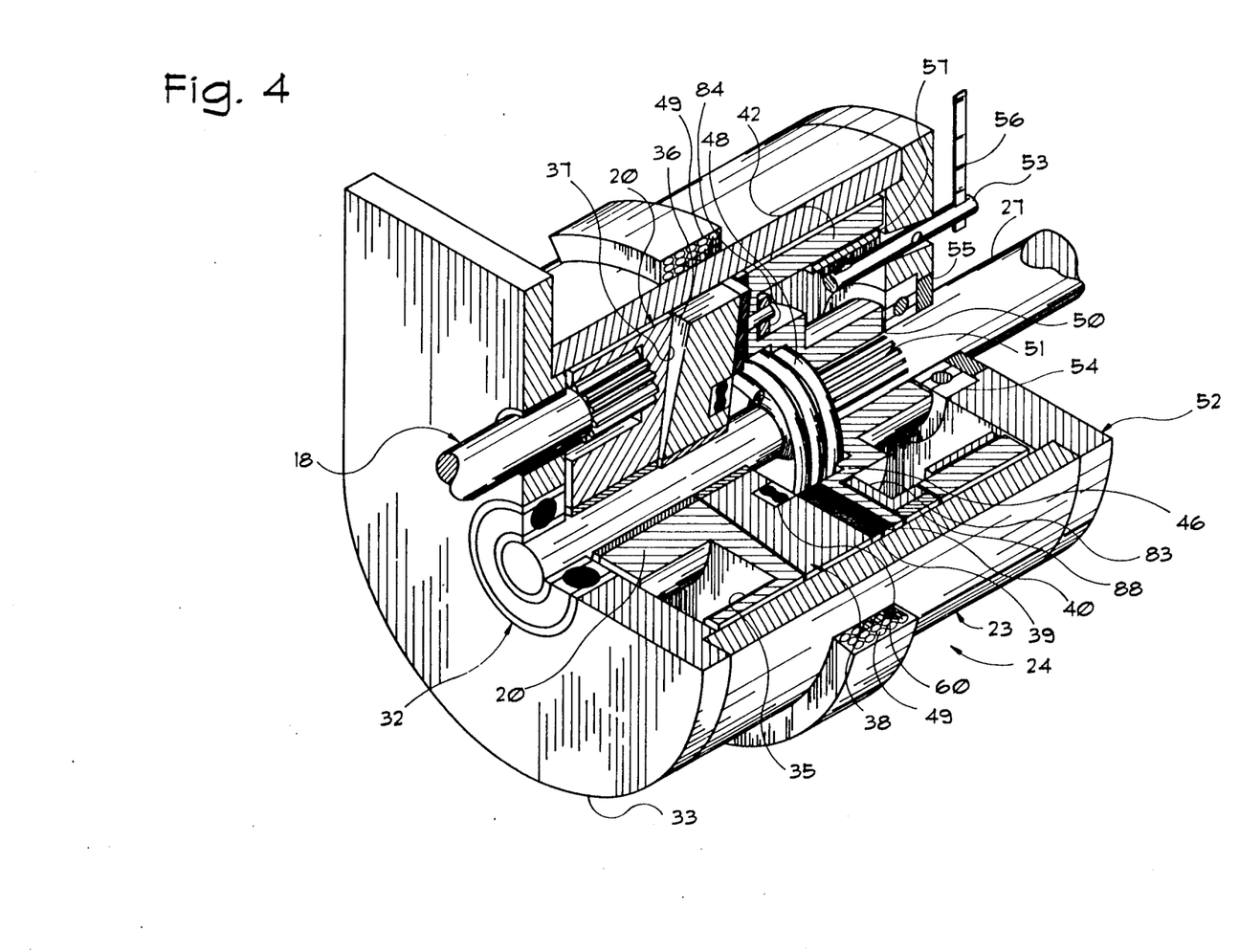
FIG. 4 is a perspective, broken view of the apparatus disclosed in FIG. 2, with some parts being cut away therefrom and some of the remaining parts being shown in cross-section.

As best seen in FIGS. 2 and 4, the ring gear 20 provides a rotatable annular member that is journaled for free rotation on the axle. The ring gear 20 has an inner toothed gear surface 35 that is always meshed with the drive gear formed on the shaft end 19. The opposed side of the ring gear 20 has a tapered cam surface 36, the details of which are more fully described hereinafter; and as illustrated in the Horn U.S. Pat. No. 2,915,156, for example.

An annular pressure plate 38 is rotatably received by a medial length of axle 27 and is mounted adjacent to the ring gear 20. The annular pressure plate 38 is provided with a tapered cam surface made complementary respective to the confronting tapered cam surface 36 of the ring gear 20. The annular pressure plate 38 includes a clutch pad 39 formed on the face opposite to the cam surface 37 thereof.

A clutch pad 40 is formed on the face of a control cylinder 42 on the side thereof that confronts clutch pad 39 of the annular pressure plate 38. Opposed end 44 of control cylinder 42 is provided with suitable brake means illustrated as a lever 56 actuated brake 57 and shoe 58. Numeral 45 indicates the outer circumferentially extending surface of the control cylinder 42. An eddy current clutch actuator 49 is included for augmenting the action of biasing means 48, shown as a coil spring for illustrative purposes. Numeral 43 indicates part of a governor system, as will be more fully discussed later on herein.

Figure 5:
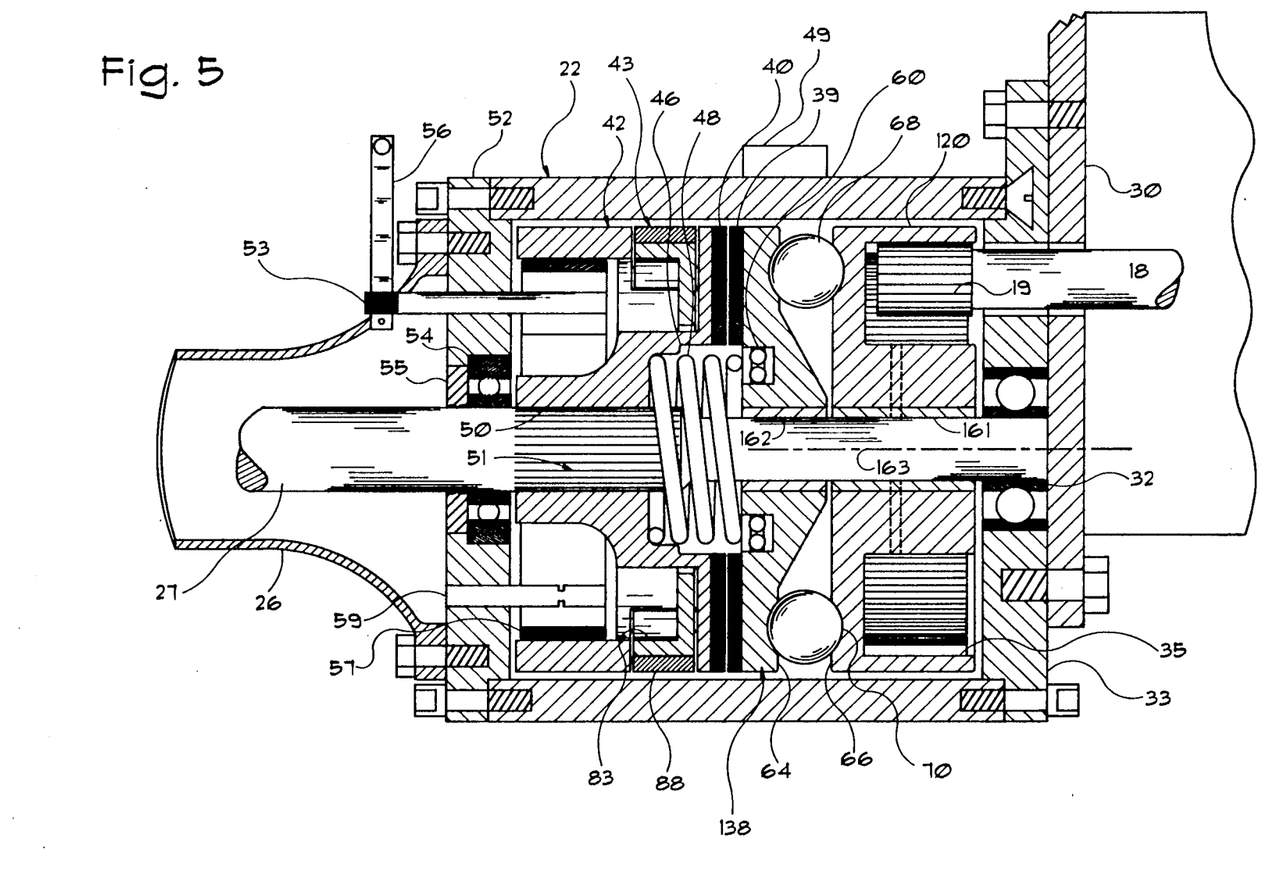
FIG. 5 is an enlarged, fragmentary, part longitudinal cross-sectional view of part of another embodiment of the invention.

As best seen in FIGS. 1, 2 and 5, a cavity or recess 46 of a size to receive the biasing means 48 therein such that the ends of the spring bear against adjacent sides of the pressure plate 38 and control cylinder 42. The biasing means is illustrated as a compression spring 48. Numeral 49 is a 12 volt DC magnetic coil that circumferentially extends about the gear box for augmenting the biasing means 48 by magnetically attracting the pressure plate 38 or 138.

Splined male and female surfaces 50, 51 removably affix shaft 27 to the control cylinder 142. The control cylinder 42 and 142 act as a drive member for the wheel axle 27. End plate 52 closes the output side of the gear box. Bearings 54 and seals 55 are suitably mounted within end-plate 52, using known techniques.

In FIG. 5, together with FIGS. 1 and 2, the illustrated brake assembly includes an activating rod 53 connected to lever 56 that when actuated expands brake shoe 57 with high friction engagement respective to the illustrated brake drum 58. Stabilizing pin 59 maintains the coacting parts properly aligned.

Bearing means 60 engages the rotating end of spring 48 while bushings 61 and 62 provide low friction engagement of ring gear 20 and the free floating annular pressure plate 38 respective to axle 27.

Figure 6:
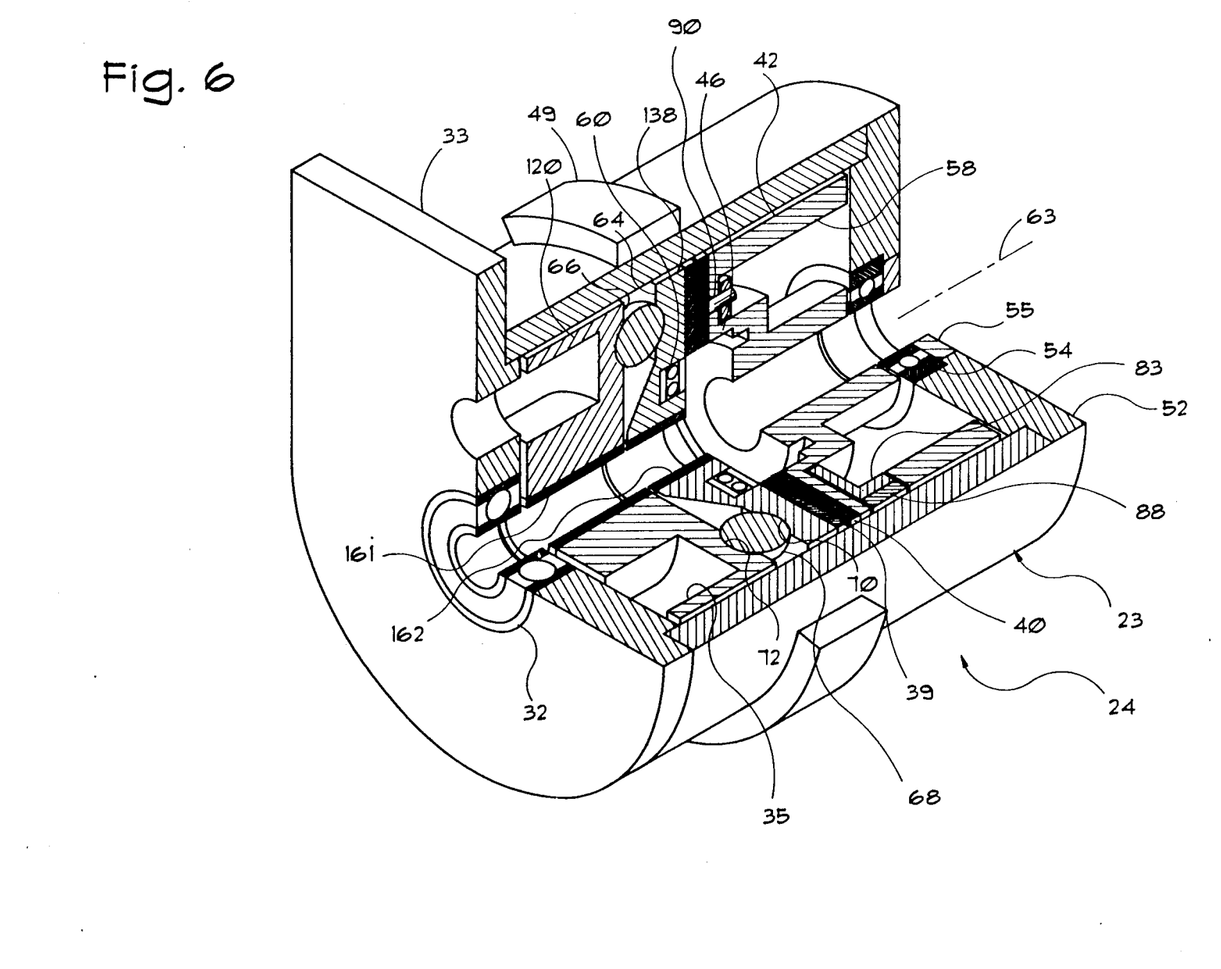
FIG. 6 is a perspective, broken view of the apparatus disclosed in FIG. 5, with some parts thereof being cut away therefrom and some of the remaining parts being shown in cross-section.
Figure 7:
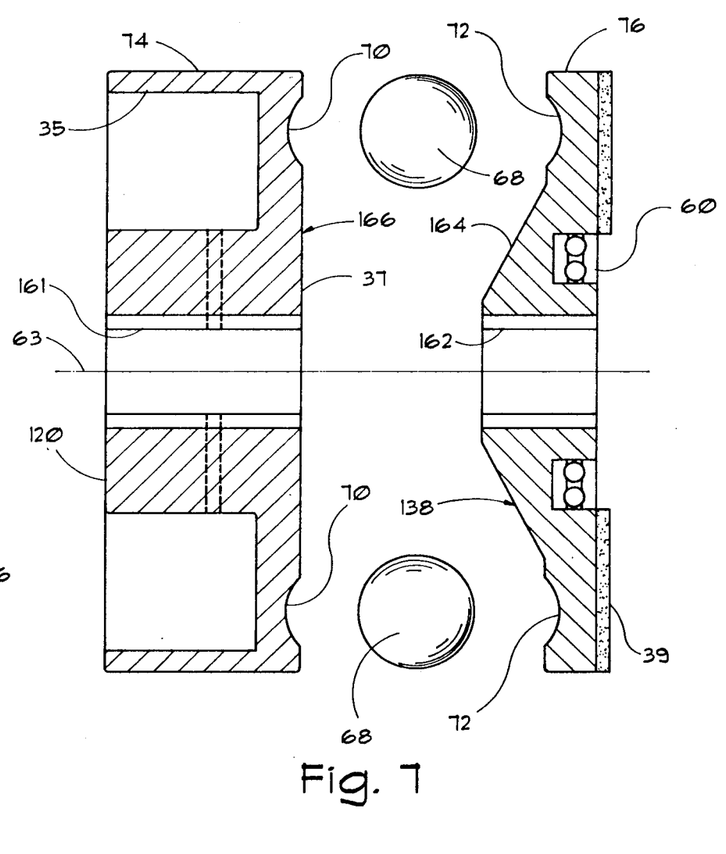
FIG. 7 is an enlarged, detailed, cross-sectional view of part of the apparatus of FIGS. 5 and 6.
Figure 8:
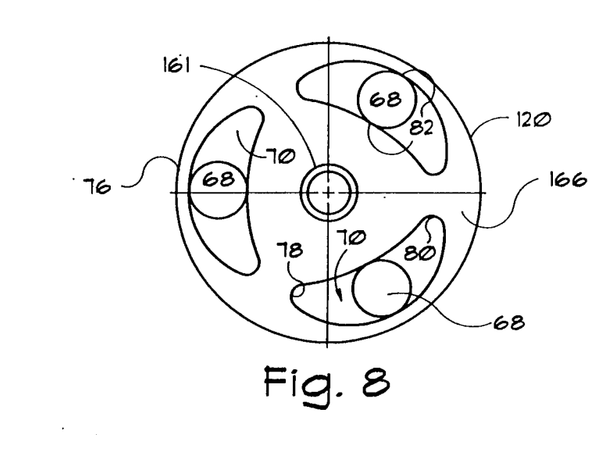
FIG. 8 is an enlarged, detailed, front view of part of the apparatus of FIG. 7; and, FIG. 9 is a front view which sets forth a governor apparatus for use in conjunction with the apparatus disclosed in FIGS. 1-6.

In the embodiment set forth in FIGS. 5-8, the confronting faces 64, 66, respectively, of the ring gear 120 and pressure plate 138, respectively, are provided with the illustrated cam means in the form of a ball 68 received within each of a plurality of cavities 70. As seen in FIGS. 6 and 8, there is a ball 68 for each of three cavities. Numeral 72 indicates three inclined planes formed in the faces 64 and 66. Numeral 74 indicates the outer circumference of ring gear 120 while numeral 76 indicates the outer circumference of the annular pressure plate 138. The details of the groove 70 is seen at 78, 80 and 82 of FIGS. 7 and 8. The balls and cavities are circumferrentially spaced 120 degrees apart, as illustrated.

Figure 9:
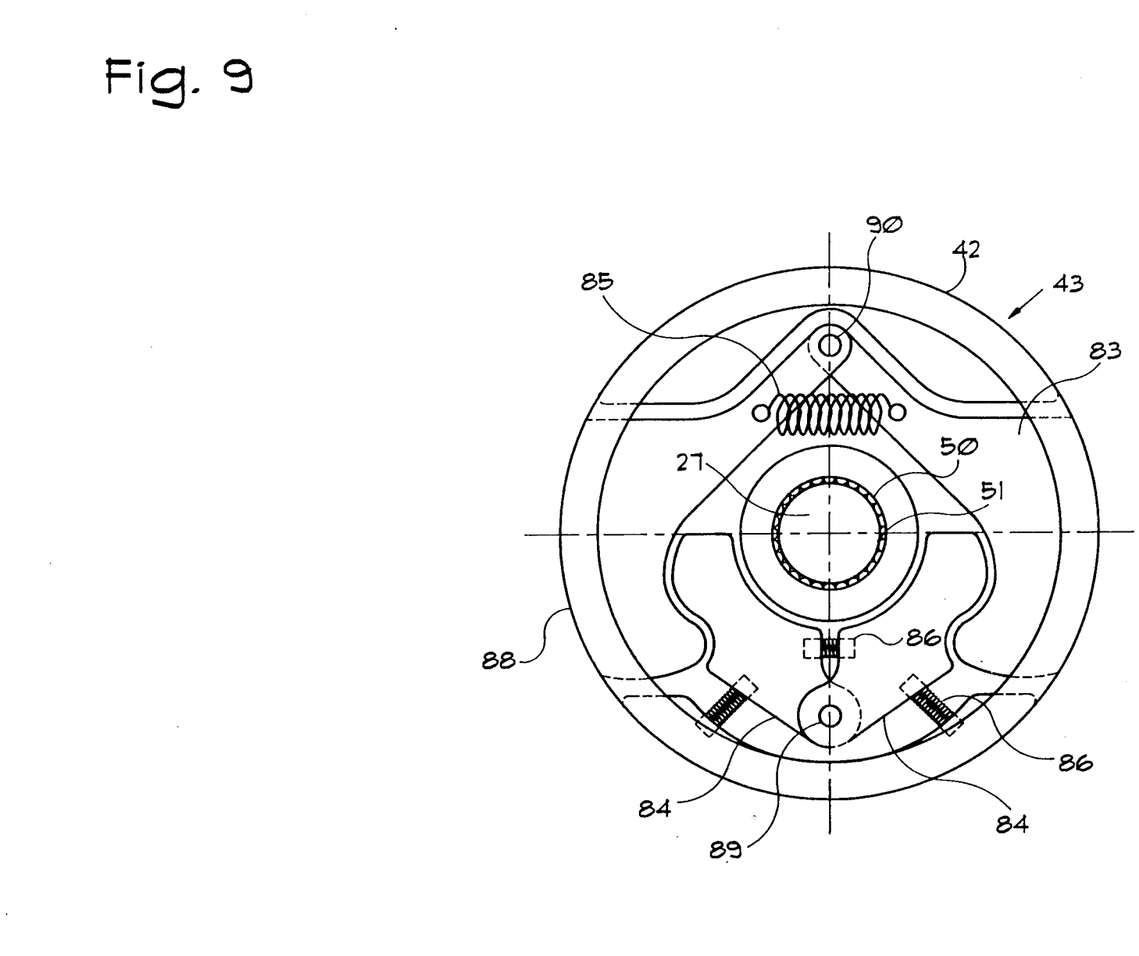

FIG. 9 illustrates a governor 43 that prevents overspeed beyond a selected maximum rotational velocity that is dependent upon the mass of the weights and the magnitude of the spring forces. The governor apparatus 43 is attached to and rotates with control cylinder 42 in the suggested manner of FIG. 2.

The rotating governor includes fly weight 83 and 84 mounted on the side of control cylinder 42 that is adjacent to pressure plate 38. Hence the rotating governor is fixed respective to the control cylinder 42 and is located adjacent to pressure plate 38. The rotating governor is located inside the control cylinder 42.

Tension coil spring 85 is a return spring that biases the fly weights together. Stop means 86, 86' limits the movement of the fly weights. A pair of brake pads 88 is formed on the outer face of the fly weights 88, in a manner similar to brake shoes, for engaging the inside peripheral wall of the illustrated housing. Pins 89 and 90 secure the flyweights in mounted relation and allow centrifugal force to pivot the fly weights thereabout and into engagement with the housing as the rotational speed reaches a predetermined value.

In FIG. 2, for example, a medial length of the control cylinder 42 has a groove extending circumferentially thereabout of a size to receive governor 43 of FIG. 9 in mounted relationship therewithin, preferably by the provision of male splines formed on the bottom of the control cylinder groove and female splines formed axially within the governor body.

An externally mounted D.C. Eddy current clutch coil 49 magnetically cooperates with the free floating pressure plate 38 to resist rotation of the pressure plate 38 and thereby force the cam means 36, 37 to move the pressure plate 38 axially and thereby engage the confronting clutch pads located between annular plate 38 and control cylinder 42. Hence, the Eddy current coil 49 assists the free floating clutch to cause a positive, smooth engaging system when accelerating and braking by the use of appropriate switch means connected to suitable circuitry for achieving this operation.

The arrangement of the two opposing gear boxes, together with the other apparatus of the invention, respective to the power source causes the axles to always be in a positive traction mode except when a differential action is needed, as for example when the vehicle is turning.

An important feature of the invention is the enclosure of the mechanical parts in a controlled environment; and to provide a system that will at all times return to a neutral mode when there is no power source applied or connected thereto. Main spring 48, by which the amount of force needed to engage apparatus 20 and 38, is controlled, and all of the parts, save the power shaft 18, is always rotating in the same direction. The apparatus is light weight, inexpensive, and requires few moving parts and not much maintenance. The mechanical parts are enclosed within an oil filled housing to thereby prolong the life of the apparatus. The Eddy current clutch system, when in the braking mode, causes clutches 39, 40 to engage and rotate the power shaft to assist in the braking system. The vehicle can be moved easily when no energized. The apparatus of the invention has a split cam means controlled by an electromagnet that positively engages the drive train when accelerating and decelerating by the employment of suitable circuitry.

I claim:

1. A clutch drive differential system for propelling a vehicle of the type that is supported by a pair of drive wheels;

said differential system includes a wheel axle for driving each said wheel; a right axle housing, a left axle housing, one said wheel axle being journaled within one said housing, a control cylinder in each said housing attached to rotate said wheel axle; a ring gear in each said housing journaled to said wheel axle, said ring gear has opposed faces, one said face is a cam face; a pressure plate in each said housing journaled to said wheel axle, said pressure plate has opposed faces, one of said opposed faces is a clutch face and the other of said opposed faces is a cam face that confronts the cam face of the ring gear;

a motor driven shaft that extends in opposed directions into driving engagement with a ring gear at each opposed end thereof; said clutch face on said pressure plate is located on the side adjacent said control cylinder;

means by which said cam faces of said ring gear and said pressure plate move said ring gear and said pressure plate axially apart and thereby force the confronting clutch faces together in proportion to the torque effected between said cam faces on said ring gear and pressure plate.

2. The system of claim 1 wherein said cam face of the pressure plate and the ring gear is a wedge-like surface that forces the pressure plate and the ring gear apart when the pressure plate and the ring gear rotate respective to one another.

3. The system of claim 1 wherein said cam face of the pressure plate and the ring gear is a plurality of balls and grooves arranged 120 degrees apart to form said cam means by which the pressure plate and ring gear are forced apart to concurrently force the clutch pads together.

4. The system of claim 1 wherein said pressure plate and ring gear are moved towards one another by an Eddy current coil.

5. The system of claim 1 wherein said motor shaft terminates in a gear which engages an internal gear of said ring gear.

6. The system of claim 5 wherein said cam face of the pressure plate and the ring gear is a wedge-like surface that moves the pressure plate and the ring gear apart when the pressure plate and the ring gear rotate respective to one another.

7. In a vehicle having a prime mover and a pair of wheels, an axle connected to each wheel; at least one axle being driven by said prime mover via a differential transmission comprising:

an input shaft having opposed ends, a ring gear, a gear fixed to one input shaft end engaging and driving the ring gear; a pressure plate, said ring gear and pressure plate have a cam assembly therebetween; said ring gear and pressure plate are journaled to said at least one axle; said pressure plate having a clutch pad on the side opposed to the cam thereof and said control cylinder having a clutch pad that is engaged with the clutch pad of the pressure plate;

means biasing said pressure plate and said control cylinder apart; said cam on said ring gear engages said cam on said pressure plate to force said ring gear and said pressure plate apart and thereby force the clutch pads on said control cylinder and said pressure plate together to thereby interconnect the input shaft to said at least one axle.

8. The combination of claim 7 wherein said cam face of the pressure plate and the ring gear is a wedge-like surface that forces the pressure plate to move axially along the wheel axle when the ring gear is forced to rotate by said input shaft.

9. The combination of claim 7 wherein said cam face of the pressure plate and the cam face of the ring gear include a plurality of grooves arranged 120 degree intervals and which cooperate with a ball in each of said grooves to force the ring gear and pressure plate apart.

10. The combination of claim 7 wherein said cam face of the pressure plate and the ring gear includes an Eddy current coil which is energized to force the cam surfaces together.

11. The combination of claim 7 wherein said motor shaft terminates in said input shaft which engages a gear mounted on said ring gear.

12. The combination of claim 7 wherein said cam face of the pressure plate and the ring gear is in the form of balls spaced at 120 degree intervals that cooperate with grooves, and includes an Eddy current coil for moving the pressure plate toward the coil and thereby force the cam faces together, and wherein said motor shaft terminates in an input shaft which engages a toothed surface of the ring gear.

13. An improved differential system for propelling a vehicle comprising an input shaft; said input shaft having opposed ends, a housing at each shaft end; a drive axle mounted for rotation in each said housing;

within each said housing there is included a first rotatable member journaled to said axle and connected to be rotated by one of said ends of the input shaft, a face on said first rotatable member;

a second rotatable member journaled on each said axle, said second rotatable member having opposed faces, said first and said second rotatable member having confronting faces, means on said confronting faces for moving said first and said second rotatable member axially respective to each other in response to relative rotational movement therebetween; said second rotatable member having a clutch face on a side thereof that is opposed to the first rotatable member;

a drive member affixed to each said axle; said drive member has a clutch face that confronts said clutch face of said second member; the clutch face on said second rotatable member and the clutch face on said drive member are moved into engagement respective to one another in response to movement of said means on said confronting faces for moving said first and said second rotatable member axially respective to each other.

14. The improvement of claim 13 wherein said cam face of said first and second rotatable member has a curved surface formed thereon that presents wedge-like eccentric faces for forcing the first and second members to move axially respective to one another.

15. The improvement of claim 13 wherein said cam face of said pressure plate and said first rotatable member includes balls spaced at 120 degree intervals that cooperate with grooves, and further includes an Eddy current coil for moving said second rotatable member toward said first rotatable member and thereby force said cam means together, and wherein said input shaft terminates in a drive gear which engages a toothed surface of said first rotatable member.

16. The improvement of claim 13 wherein said cam face of said first and second rotatable members is a curved surface that forces said second rotatable member to move axially along the wheel axle when said first rotatable member is forced to rotate by said input shaft.

17. The improvement of claim 13 wherein said cam face of said first and second rotatable member is a plurality of balls and grooves arranged at 120 degree intervals to form said cam means by which said first and second rotatable member are forced apart to concurrently force the clutch pads together.

18. A clutch drive differential having an input shaft; said input shaft having an end, a housing about a marginal end of the input shaft; a drive axle mounted for rotation in said housing;

within said housing there is included a first rotatable member journaled to said axle and connected to be rotated by said input shaft, a circumferentially extending face on said first rotatable member;

a second rotatable member journaled on said axle, said second rotatable member having opposed faces, said first and said second rotatable member having confronting faces, means on said confronting faces for moving said first and said second rotatable member axially respective to each other in response to relative rotational movement therebetween; said second rotatable member having a clutch face on a side thereof that is opposed to said first rotatable member;

a control cylinder affixed to said axle; said control cylinder has a clutch face formed thereon that confronts said clutch face of said second member; said clutch face on said second rotatable member and said clutch face on said drive member are moved into engagement respective to one another in response to movement of said means on said confronting faces moving said first and said second rotatable member axially respective to each other.

19. The improvement of claim 18 wherein said means on said confronting faces includes a cam face on said first and second rotatable members, said cam face includes a plurality of grooves arranged 120 degrees apart and a ball in each grooves which cooperates with said groves to force said first and second rotatable members apart.

20. The improvement of claim 19 wherein an Eddy current coil is included which is energized to place a retarding force on said second rotatable member to move the second rotatable member axially along said wheel axle by said cam means to thereby engage said clutch faces on said second rotatable member and said control cylinder.

* * * * *